United States Patent
Ishikawa et al.

(10) Patent No.: US 7,873,871 B2
(45) Date of Patent: Jan. 18, 2011

(54) COMMUNICATION CONTROL SYSTEM AND COMMUNICATION CONTROL METHOD

(75) Inventors: Masakazu Ishikawa, Hitachi (JP);
Akira Bandou, Hitachi (JP); Masahiro Shiraishi, Hitachi (JP); Masamitsu Kobayashi, Hitachi (JP); Yasuyuki Furuta, Naka (JP); Akihiro Onozuka, Hitachi (JP); Shin Kokura, Hitachi (JP); Eiji Kobayashi, Hitachinaka (JP); Satoru Funaki, Hitachi (JP); Takashi Umehara, Hitachi (JP); Naoya Mashiko, Hitachiota (JP); Yuusuke Seki, Hitachi (JP); Tatsuyuki Ootani, Hitachi (JP)

(73) Assignees: Hitachi, Ltd., Tokyo (JP); Hitachi Information & Control Solutions, Ltd., Ibaraki (JP)

( * ) Notice: Subject to any disclaimer, the term of this patent is extended or adjusted under 35 U.S.C. 154(b) by 594 days.

(21) Appl. No.: 11/768,241

(22) Filed: Jun. 26, 2007

(65) Prior Publication Data
US 2008/0016404 A1    Jan. 17, 2008

(30) Foreign Application Priority Data
Jun. 30, 2006    (JP)    ............................. 2006-180643

(51) Int. Cl.
G06F 11/00    (2006.01)
(52) U.S. Cl. .......................................... 714/27; 714/42
(58) Field of Classification Search ................... 714/27
See application file for complete search history.

(56) References Cited

U.S. PATENT DOCUMENTS

| | | | |
|---|---|---|---|
| 4,839,745 A * | 6/1989 | Tindall | 386/113 |
| 5,274,797 A | 12/1993 | Barlow et al. | |
| 5,555,361 A * | 9/1996 | Narita et al. | 345/168 |
| 6,160,488 A * | 12/2000 | Honda | 340/5.65 |
| 6,374,387 B1 * | 4/2002 | van den Berghe | 714/790 |
| 6,675,284 B1 * | 1/2004 | Warren | 712/38 |
| 7,409,486 B2 * | 8/2008 | Torigoe et al. | 710/311 |
| 2002/0037033 A1 * | 3/2002 | During | 375/224 |
| 2005/0050401 A1 * | 3/2005 | Matsuki et al. | 714/42 |
| 2006/0143546 A1 * | 6/2006 | Cho | 714/46 |

(Continued)

FOREIGN PATENT DOCUMENTS

CN    87104534    2/1988

(Continued)

*Primary Examiner*—Scott T Baderman
*Assistant Examiner*—Kamini Patel
(74) *Attorney, Agent, or Firm*—Antonelli, Terry, Stout & Kraus, LLP.

(57) ABSTRACT

A programmable electronic controller in which one central arithmetic processing unit and a plurality of input devices and output devices are connected by means of a parallel bus, the controller being basically configured to activate a self-diagnostic function and a diagnostic test of the input devices and the output devices with an instruction from a microprocessor of the central arithmetic processing unit; and to judge the result with the microprocessor of the central arithmetic processing unit, by using the microprocessor installed in the central arithmetic processing unit also as a processor for tests (diagnostic tests) of the self-diagnostic function of the input devices and output devices and conducting tests of the self-diagnostic function of the plurality of input devices and output devices with the central arithmetic processing unit.

2 Claims, 14 Drawing Sheets

U.S. PATENT DOCUMENTS

2007/0067524 A1* 3/2007 Mouri et al. ................ 710/106
2007/0079211 A1* 4/2007 Kwak ......................... 714/758
2007/0272751 A1* 11/2007 Tsurumi ..................... 235/437

FOREIGN PATENT DOCUMENTS

JP      06-290066       10/1994
JP      2003-258833     9/2003

* cited by examiner

FIG. 2 (INPUT INTRODUCTION OPERATION OF INPUT DEVICES I1 TO In)

FIG. 3 (DIAGNOSTIC TEST OPERATION OF INPUT DEVICES I1 TO In)

FIG. 4 (SELF DIAGNOSIS OPERATION OF INPUT DEVICES I1 TO In)

FIG. 6 (DIAGNOSTIC TEST OPERATION OF OUTPUT DEVICES Q1 TO Qn)

FIG. 7 (SELF DIAGNOSIS OPERATION OF OUTPUT DEVICES Q1 TO Qn)

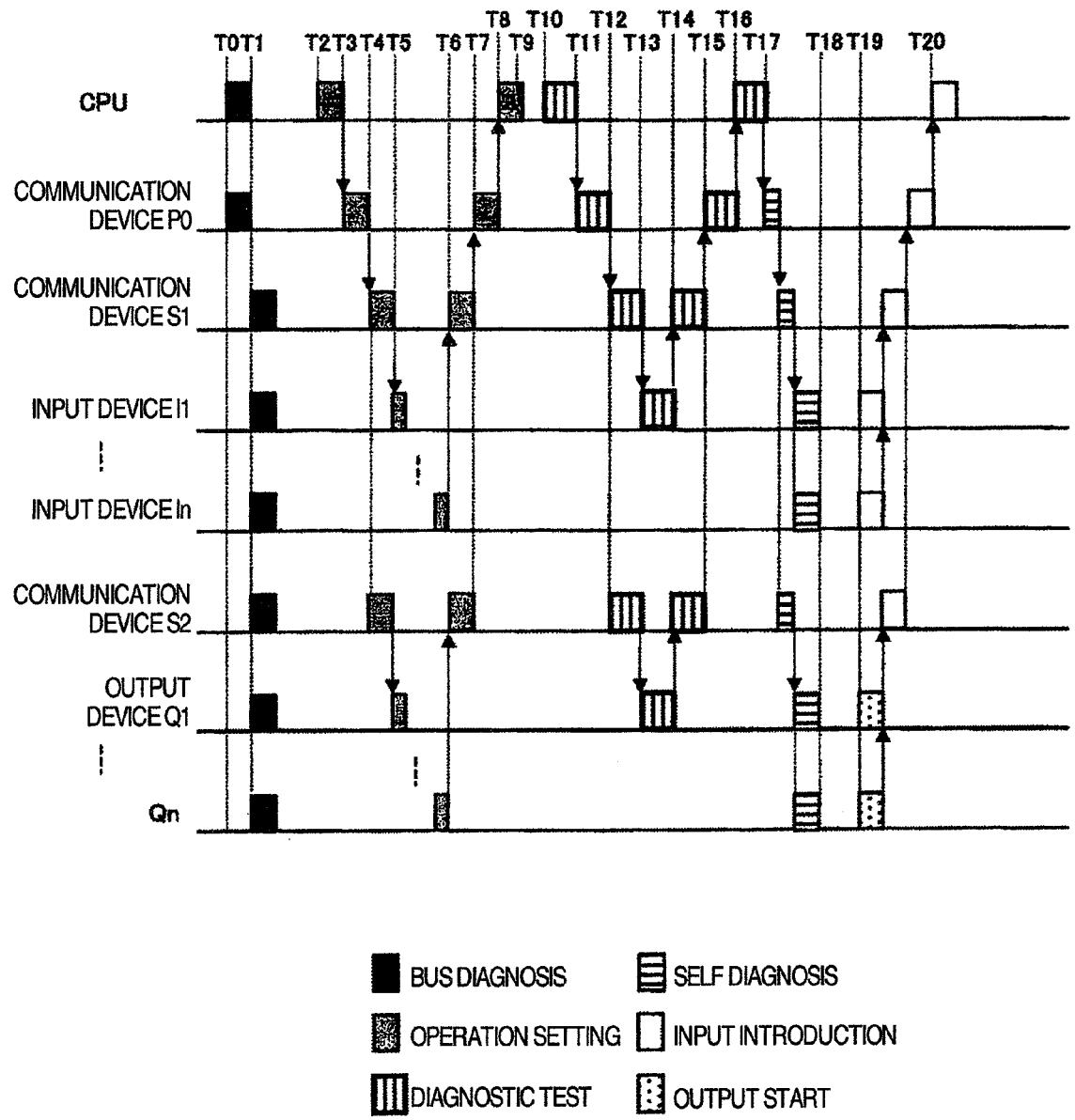

COMMUNICATION CONTROL SYSTEM AND COMMUNICATION CONTROL METHOD

BACKGROUND OF THE INVENTION

The present invention is concerned with a communication control system and a communication control method and pertains in particular to a communication control system and a communication control method suitable for malfunction detection and malfunction detection function diagnosis of a plurality of input devices and output devices requiring high reliability and based on a central arithmetic processing unit.

The present invention can be utilized, as far as programmable electronic controllers used in plant control are concerned, as a means and a method to improve the safety of the devices at low cost, without making the devices complex.

With the technical advancement in the electronics and information technology fields, and the increased functional complexity and compositeness demanded of single devices becoming driving forces, the application range of programmable electronic devices is becoming wider and at the same time, the reliability demanded of programmable electronic controllers is becoming higher.

In the midst of scale increases and interlinking of plants advancing and highly automated plant operation also being carried out in recent years, there are also the problems of the spread of international safety standards and the lack of experienced and skillful staff, so on top of the safety measures built up since some time ago, a state is being reached in which further improvement in safety is required, and it has come to be regarded as important to prevent and mitigate, in their respective layers, the occurrence of accidents and the extension of damage.

In order to fulfill the aforementioned functional safety standards in plant controllers, it is required to operate surely in case an anomaly is detected, and in the unlikely event of there being a malfunction, it is demanded to stop the process on the safe side, so special design with serious consideration given to "safety" is required of a functional safety system. Technology of this kind of giving serious consideration to safety is e.g. described in JP-A-1994-290066.

In programmable electronic controllers, it is required to improve the hardware malfunction detection rate, so in order to satisfy this, it is common practice to load a variety of self-diagnostic functions. Moreover, there are required checks of whether these added self-diagnostic functions are actually operating, so policies such as embedding microprocessors in input devices and output devices implementing checks of the soundness of the self-diagnostic functions are carried out.

SUMMARY OF THE INVENTION

Regarding the self-diagnostic functions of programmable electronic controllers, there is e.g. investigated an output matching comparison using a plurality of processors and a detection means and technique for the fixing of a bus between a central arithmetic processing unit and an input and output device. Also, in the case where a relay communication controller is connected from a central arithmetic processing unit and between an input device and an output device, it is investigated to strive for an improvement in the reliability of data communication between the central arithmetic processing unit and the terminal of an input/output device. There is mentioned a means and a technique of carrying out diagnosis of the fixing of a bus connecting the central arithmetic processing unit and an input device and an output device, and by checking the soundness of the communication path between the central arithmetic processing unit and the input/output device, there is investigated improving the safety of the devices.

When it comes to functional safety, in order to verify, with respect to a programmable electronic controller, the fact that the device is operating normally, it is necessary to load a self-diagnostic function and, even in the unlikely event that a device malfunctions, to devise the device so that a dangerous state is not entered. Moreover, since there occurs the possibility that a malfunction occurs in the added self-diagnostic function, that it is not possible to detect the malfunction that was originally supposed to be detected, and that the object of control transitions to a dangerous state, it becomes necessary to also investigate the fact that a malfunction of the self-diagnostic function does not transition the object of control into a dangerous state. The malfunction detection of the self-diagnostic function in a programmable electronic controller operates a self-diagnostic function of an input device and an output device by means of a microprocessor, there normally being implemented a technique whereby the self-diagnostic function verifies regularity and anomaly of the self-diagnostic function surely. For performing a check of the soundness of the self-diagnostic function, the advantage of using a microprocessor resides in the point that the malfunction injection timing and the malfunction injection pattern can be arbitrarily set in software.

However, the installation of a microprocessor in the input devices and output devices most used in control systems brings an increase in cost and device complexity, and also, if self diagnoses and malfunction injections are activated in each device, there is the problem that it becomes difficult to maintain the simultaneity and periodicity of inputs to and outputs from the object of control.

The present invention has for an object, while suppressing cost increases and device complexity, to provide a communication control system and a communication control method improving the simultaneity and periodicity of inputs to and outputs from the object of control and capable of device diagnosis.

In order to attain the aforementioned object, the present invention is configured so that it has a connection device carrying out at least either of the operations of transferring data sent via a communication channel to an object of control, or receiving data of the object of control and sending the data via a communication circuit; and the connection device has a reception part receiving data from the communication channel and a matching comparison part comparing the matching of designated data received in the reception part and data correlating with the designated data and generating matching result information, the matching result information being information transmitted via a transmission part, and has an anomaly judgment device receiving the matching result information and, based on the concerned information, making an anomaly judgment.

Alternatively, the present invention is configured so that it has a connection device carrying out at least either of the operations of transferring data sent via a communication channel to an object of control or receiving data of the object of control and sending the data via a communication circuit; and the connection device has a storage part storing the data and stores the designated data in the storage part; and, in case a judgment command is received, is configured so that the data input into the storage part and the stored data are compared and the matching result information is transmitted.

Specifically, the microprocessor installed in the central arithmetic processing unit is also used as a processor for self-diagnostic function tests (diagnostic tests) of an input device and an output device, so by conducting the self-diagnostic function tests of a plurality of input devices and output devices in the central arithmetic processing unit, the need for installation of microprocessors onto input devices and output devices connected to the central arithmetic processing unit is removed, the diagnostic tests of the input devices and the output devices are activated with a command from the microprocessor of the central arithmetic processing unit, and the central arithmetic processing unit cyclically performs diagnostic tests of the plurality of input devices and output devices one by one.

Also, the invention is constituted by a switch for switching the test reference signals of the input and the output, in the case where the input devices and output devices perform the self diagnosis, and the input or the output from the object of control, and a test pattern; a comparator for checking that the input or the output matches the test reference signal; and a switch for switching the input to the comparator to either of the test reference signal or the test pattern from the central arithmetic processing unit.

Further, the central arithmetic processing unit having a microprocessor and the input devices and output devices are connected with an input/output bus and the input devices and output devices have three subsequently indicated operating modes, namely a normal operating mode in which the input is brought in from the object of control and transmitted to the central arithmetic processing unit, or an output command is made from the central arithmetic processing unit to the object of control; a self-diagnostic mode in which the input device or the output device checks the soundness of its own operation; and a diagnostic test mode in which a test pattern is transmitted from the microprocessor of the central arithmetic processing unit to the input device and the output device via the input/output bus, the test reference signal and the test pattern are comparatively matched by means of comparators inside the input device and the output device, and the microprocessor of the central arithmetic processing unit checks the soundness of the self-diagnostic function of the input device and the output device, as to whether the self-diagnostic function is regular or anomalous; wherein the input device and the output device are configured to switch between the three aforementioned operating modes in accordance with commands from the central arithmetic processing unit; and by using the microprocessor installed in the central arithmetic processing unit also as a processor for checks of the soundness of the self-diagnostic function of the input device and the output device, there is chosen, without making the circuits of the input device and the output device complex, a configuration in which it is possible, together with improving the reliability of the same as devices, to arbitrarily set a schedule executing the self diagnoses and the malfunction injection tests in the central arithmetic processing unit.

In the case where the central arithmetic processing unit and the input device or the output device are separated by some distance, a communication controller is provided in between the central arithmetic processing unit and the input device or the output device and the self diagnoses of the input device and the output device are activated by serial communication, also making it possible to check the soundness of the self diagnoses. In this case, after verifying that the diagnosis operating settings transmitted to the input device and the output device from the central arithmetic processing unit have been written regularly, the central arithmetic processing unit reads back, in order to activate the soundness check of the self diagnoses and the self-diagnostic function the diagnosis operating setting of the input device and the output device, and, only in the case where it has verified that the setting matches the commanded set value, there is activated a self-diagnostic function and a soundness check of the self-diagnostic function.

According to the present invention, it becomes possible to improve the malfunction diagnostic function of the equipment without making the circuit configuration of the input device and the output device complex. Also, it is possible to perform a soundness check of the self-diagnostic function of the input devices and output devices with the microprocessor inside the central arithmetic processing unit, carrying out the introduction of the input from the object of control and arithmetic processing and control of the output to the object of control.

BRIEF DESCRIPTION OF THE DRAWINGS

FIG. 14 is a time chart showing the operation of the second embodiment of the present invention.

DESCRIPTION OF THE EMBODIMENTS

Hereinafter, the best modes of implementing the present invention will be explained using the drawings.

First Embodiment

First, a detailed explanation will be given using FIG. 1 to FIG. 12.

Figure 1:
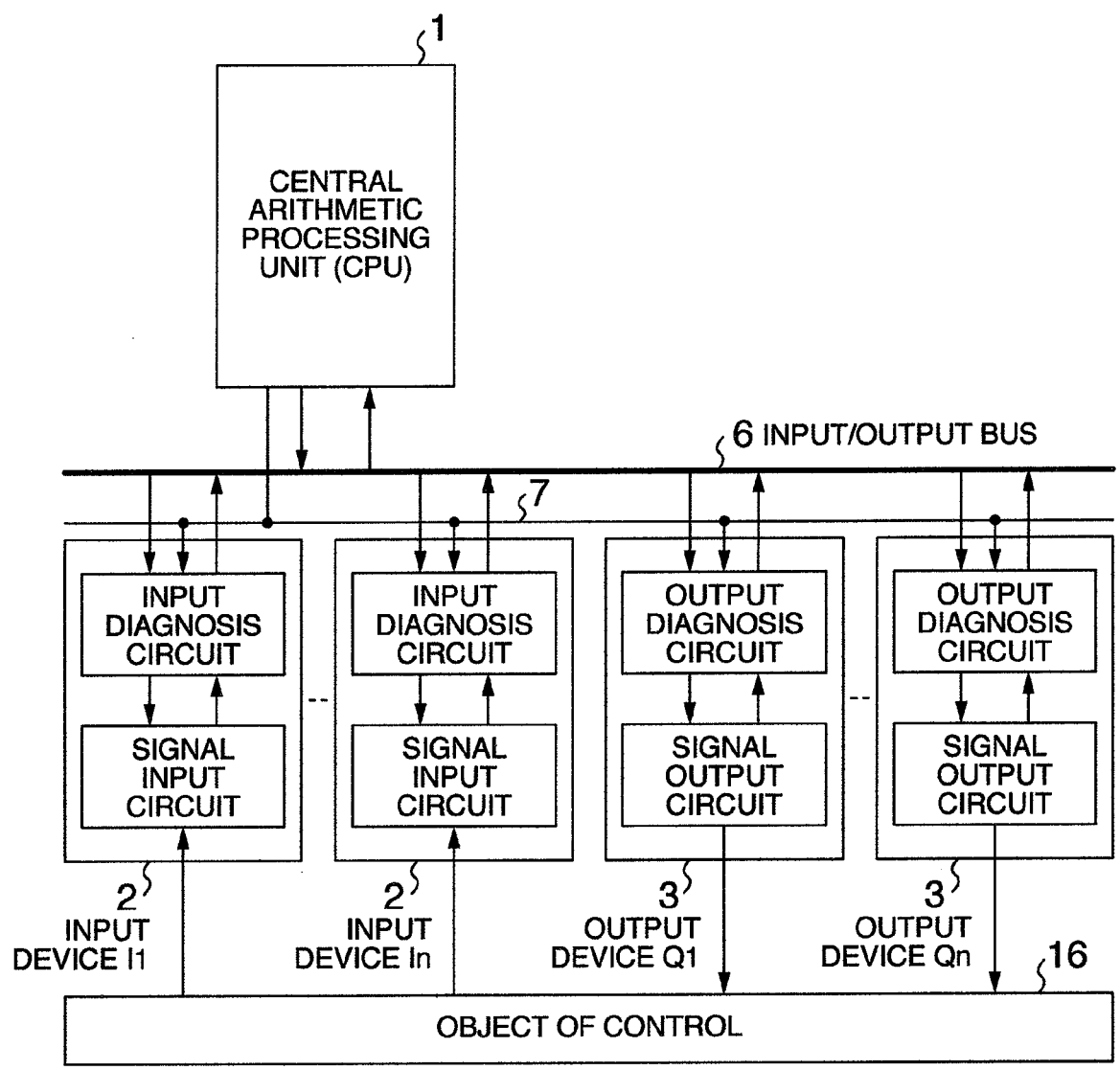
FIG. 1 is a block diagram showing the first embodiment of the present invention.

In FIG. 1, there is shown an outline system block diagram of the present embodiment. The present system is provided with a central arithmetic processing unit 1 having a microprocessor, input devices I1 to In or output devices Q1 to Qn, or both groups, central arithmetic processing unit 1 and input devices I1 to In and output devices Q1 to Qn being connected with a parallel input/output bus 6, carries out the transmission and reception of data, and performs the introduction of the input from an object of control 16, arithmetic processing, and output to object of control 16. Here, there may be a plurality of input devices and output devices that are connected via a communication path 6 to central arithmetic processing unit 1. Also, parallel input/output bus 6 is assumed to be a parallel input/output bus for increasing the speed of transmission, and central arithmetic processing unit 1 is able to carry out direct data reception from an input device 2 and transmission to an output device 3 and is configured so as to be able to ensure a regular time property and periodicity. Further, a diagnosis (below called bus diagnosis) for detecting a fixing malfunction of the signal line between parallel input/output bus 6 between central arithmetic processing unit 1, input device 2, and output device 3 is activated by means of an instruction of central arithmetic processing unit 1, a test pattern transmitted by central arithmetic processing unit 1 to input/output bus 6 is received by input device 2 and output device 3, and the received pattern, using communication separate from parallel input/output bus 6, is returned to central arithmetic processing unit 1. Central arithmetic processing unit 1 is configured so as to be able to compare the matching of the test pattern it has itself transmitted with the patterns returned from input device 2 and output device 3 and to detect the existence of a fixing malfunction of parallel input/output bus 6.

Figure 2:
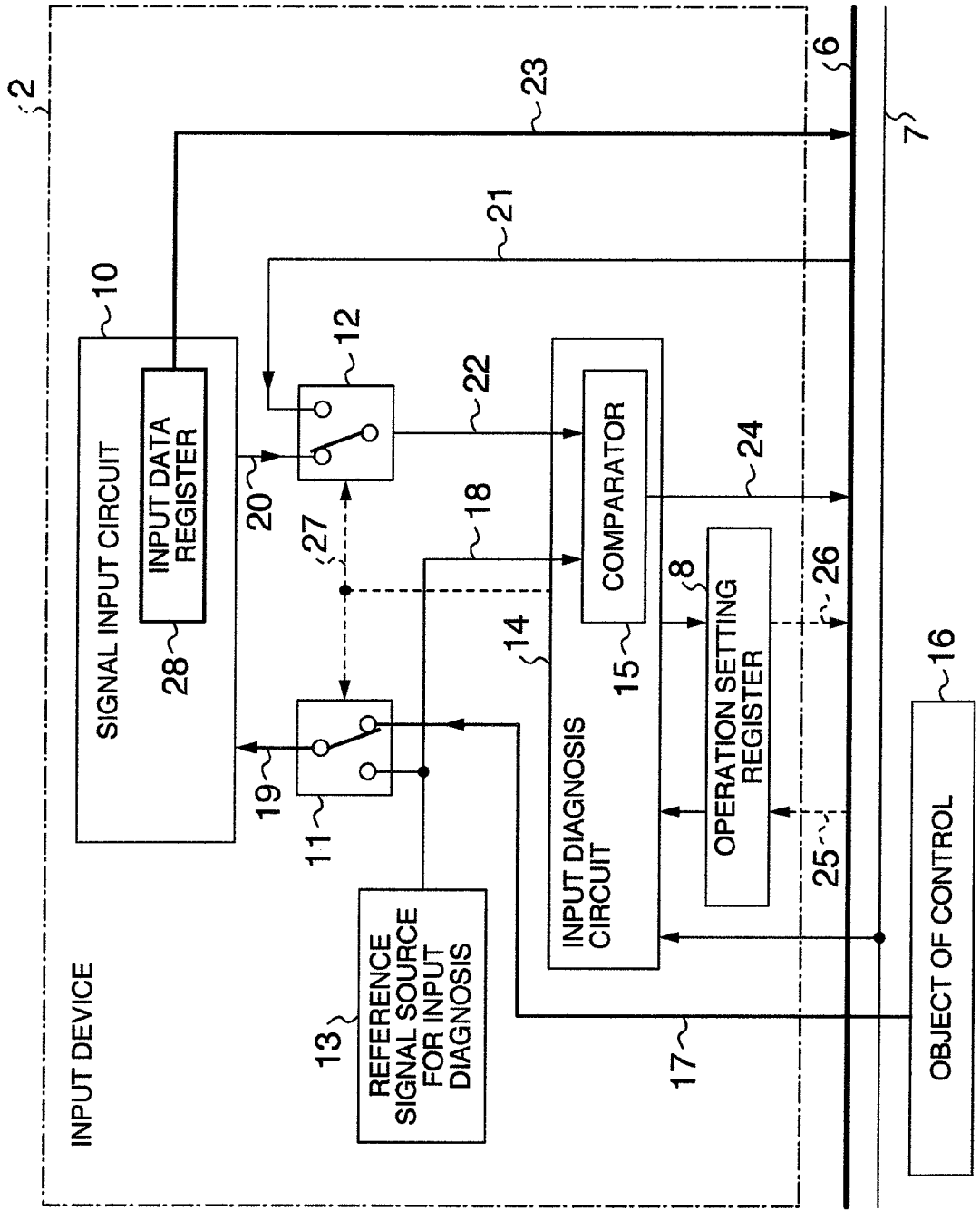
FIG. 2 is a block diagram explaining the configuration and normal input operation of an input device of the present invention.
Figure 3:
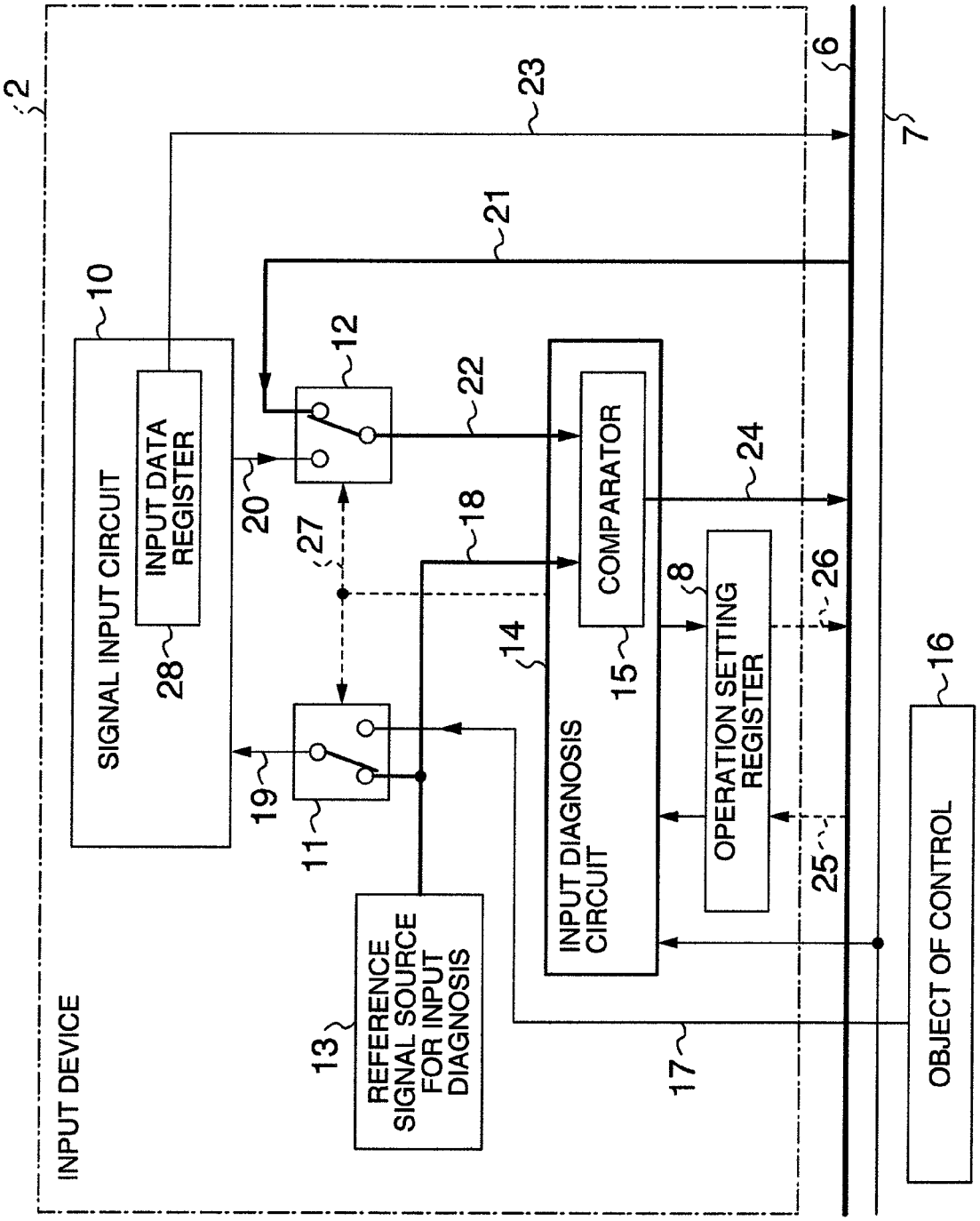
FIG. 3 is a block diagram explaining the configuration and diagnostic test operation of an input device of the present invention.
Figure 4:
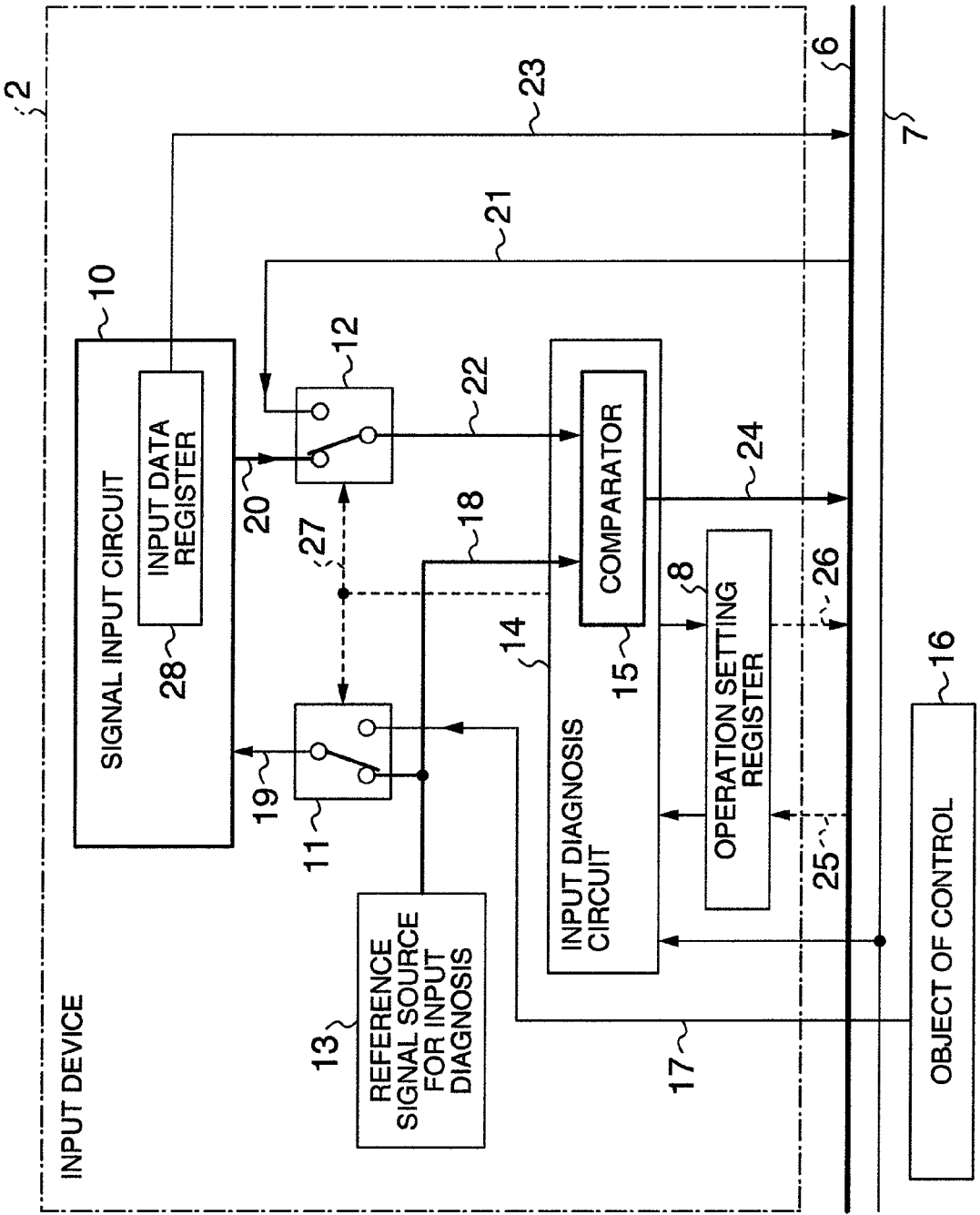
FIG. 4 is a block diagram explaining the operation of the configuration and self-diagnostic function of an input device of the present invention.

In FIG. 2 to FIG. 4, detailed block diagrams of input device 2 are shown. The circuit blocks of FIG. 2 to FIG. 4 are identical, the diagrams being discriminated by the operating modes. FIG. 2 expresses an operating mode (below called the input introduction mode) in which input device 2 introduces the input from object of control 16, a switch 11 is connected to input data 17 from object of control 16 and a switch 12 to an output 20 of a signal input circuit. FIG. 3 expresses the diagnostic test mode in which the diagnosis of input diagnosis circuit 14 of input device 2 is carried out and FIG. 4 shows the positions of switches 11 and 12 in the self-diagnostic mode in which a diagnosis of a signal input circuit 10 of input device 2 is carried out.

Figure 10:
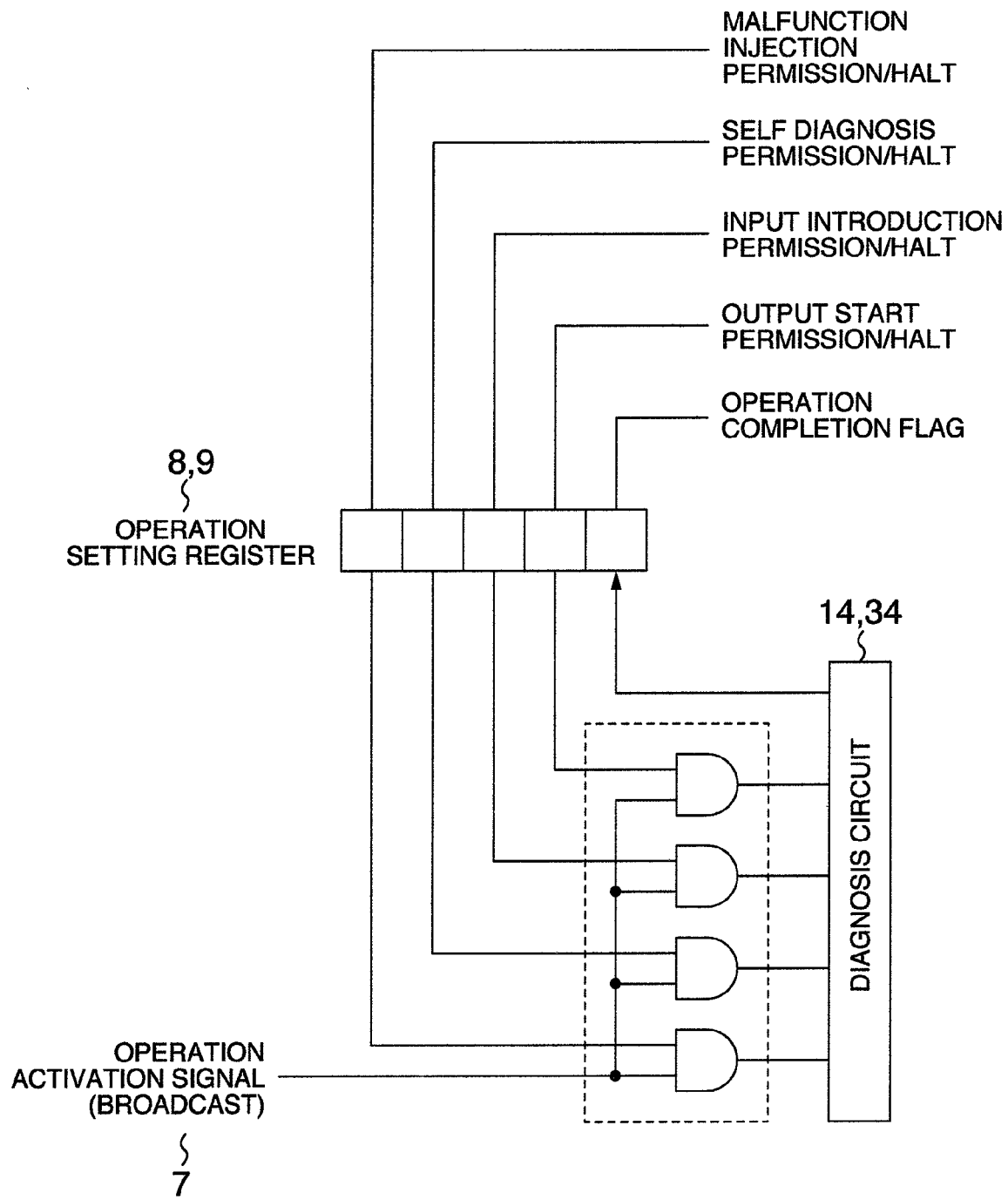
FIG. 10 is a block diagram showing the activation permission and halt operation of a diagnosis operation of the present invention.
Figure 11:
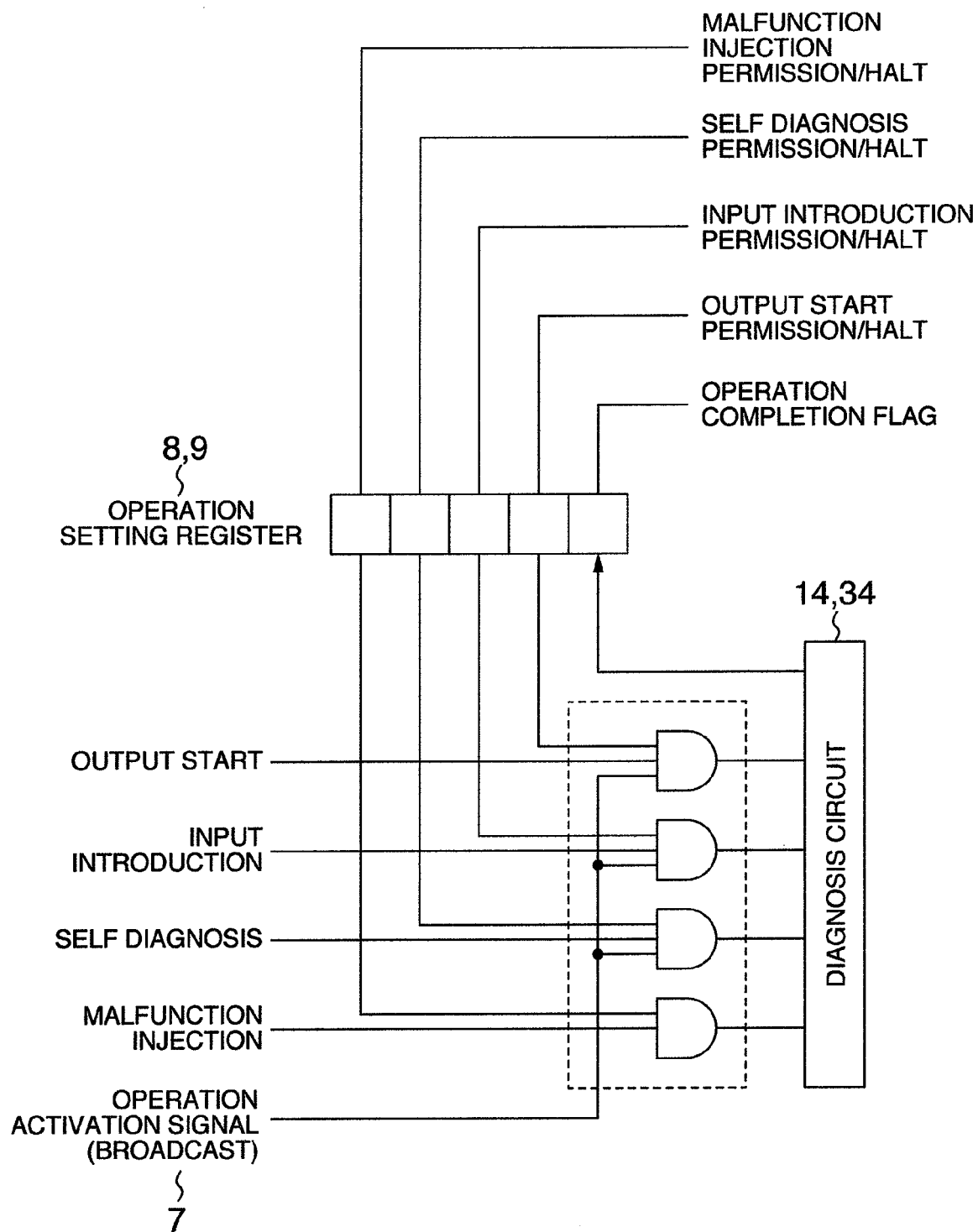
FIG. 11 is a block diagram explaining the operation of an alternative activation permission and halt.

Input device 2 has signal input circuit 10 for communicating input data 17 from object of control 16 via communication channel 6 to central arithmetic processing unit 1; a reference signal source 13 for input diagnosis for inputting reference signal 18 for input diagnosis instead of input data 17 (alternatively called the input signal) from object of control 16 in the self-diagnostic mode verifying the soundness of signal input circuit 10; switch 11 for selecting either of input data 17 from object of control 16 or reference signal 18 for input diagnosis and inputting the data into signal input circuit 10; an input diagnosis circuit 14 for verifying the soundness of signal input circuit 10; a comparator 15 for comparatively checking the soundness of input data 17 from input diagnosis reference signal 18 and object of control 16; and switch 12 selecting either of input data 17 from object of control 16 or a test pattern 21 from central arithmetic processing unit 1 and inputting the data into comparator 15. Signal input circuit 10 transmits the input signal via switch 12 to input diagnosis circuit 14. Inside input diagnosis circuit 14, there is provided an operation setting register 8 for storing the settings of the diagnosis operation and the diagnostic test operation of input device 2, the input introduction from object of control 16, and the permission and halt of the output instructions, the permission and halt of the activation of each operation being instructed from central arithmetic processing unit 1. In FIG. 10, there are shown the details of operation setting registers (diagnostic setting registers) 8 and 9 and the operation of the activation permission and halt of the operating modes. The aforementioned three operations are activated with an activation signal 7 transmitted by central arithmetic processing unit 1 via communication channel 6 to input device 2, the activated operating mode being limited only to that for which the operation is permitted by operation setting register 8. Also, the circuit is configured so that, if operation is activated with activation signal 7 from central arithmetic processing unit 1, a diagnosis completion flag of operation setting register 8 is cleared. In FIG. 10, the activation of the diagnosis operation is performed with diagnosis activation signal 7 only, but, as shown in FIG. 11, separately from diagnosis activation signal 7, it is possible to prevent faulty operation of a device in case noise is mixed in with diagnosis activation signal 7 or there has occurred a fixing in the signal level, by separately providing a function selection signal.

First, using FIG. 2, there will be given an explanation regarding the input introduction operation in which input device 2 introduces input data 17 from object of control 16. By receiving activation signal 7, input device 2 starts the operation of introducing the input from object of control 16, the activation permission for the input introduction operation being set in operation setting register 8 from central arithmetic processing unit 1 via parallel input/output bus 6 and a signal line 25 (control signal input). In the diagram, the flow of the input introduction signal is shown with a bold line. Input data 17 from object of control 16 are stored in an input data register 28 inside signal input circuit 10 via switch 11. The connection switching of switches 11 and 12 is carried out by means of a switch control signal 27 from an input diagnosis circuit 14. Exactly when storage of input data 17 from object of control 16 to the input data register inside signal input circuit 10 has come to an end, input diagnosis circuit 14 reports the completion of the input introduction to operation setting register 8, and operation setting register 8 outputs operation completion flag 26 to parallel input/output bus 6 and reports to central arithmetic processing unit 1 that the introduction of the input signal from object of control 16 has reached completion. Central arithmetic processing unit 1 receives operation completion flag 26 (input introduction completion flag) from input device 2 and reads the input data from the input data register inside signal input circuit 10 of input device 2. The data of input data register 28 are output via a signal line 23 (signal input circuit output) from signal input circuit 10 to parallel input/output bus 6 and are sent to central arithmetic processing unit 1.

At the time of the input introduction operation, the self-diagnostic function and a test of the self-diagnostic function are not performed and switch 12 is connected to an output 20 from signal input circuit 10.

Next, an explanation will be given regarding self diagnosis operation using FIG. 4. In the same way as the input introduction operation, by receiving activation signal 7, input device 2 starts the self diagnosis operation, the activation permission for the self diagnosis operation being set in operation setting register 8 from central arithmetic processing unit 1 via parallel input/output bus 6 and a signal line 25 (control signal input). The difference with the input introduction operation of FIG. 2 is that it is an operation of the connection of switches 11 and 12 and comparator 15. Input data register 14 controls switch 11 to store input diagnosis reference signal 18 from input diagnosis reference signal source 13 in input data register 28 of signal input circuit 10 and simultaneously controls switch 12 to connect one input 22 of comparator 15 to an output 20 of signal input circuit 10. Here, output 20 of signal input circuit 10 is the output of input diagnosis reference signal 18 having passed through signal input circuit 10, and the circuit is configured so that identical data result, if signal input circuit 10 operates normally. The output of input diagnosis reference signal 18 being connected to the other input of comparator 15, comparator 15 verifies that output 20 from signal input circuit 10 and the input diagnosis reference signal match and if they do not match, it judges that an anomaly is generated in signal input circuit 10 and reports a result output (anomaly detection) 24 to central arithmetic processing unit 1 via communication channel 6. Simultaneously, input diagnosis circuit 14 reports the completion of the self diagnosis to operation setting register 8 and operation setting register 8 transmits operation completion flag 26 via parallel input/output bus 6 to central arithmetic processing unit 1.

As for comparator 15, being configured from a plurality of bits, there are the cases, in case a digital signal is handled, of being configured so as to judge that there is a match if the two objects of comparison match completely and, like in the case of comparing an analog signal with a digitally converted value, of being configured so that it is judged that there is a match in view of the difference of two objects of comparison lying within a predetermined range.

Next, an explanation will be given regarding the operation of the diagnostic test, using FIG. 3. By receiving activation signal 7, input device 2 starts the diagnostic test operation, the activation permission for the diagnostic test operation being set in operation setting register 8 from central arithmetic processing unit 1 via parallel input/output bus 6 and a signal line 25 (control signal input).

At the time of the diagnostic test operation, one input of comparator 15 of input diagnosis circuit 14 is connected to input diagnosis reference signal 18, the other input of comparator 15 being switched by switch 12 from the central arithmetic processing unit to test pattern 21. Central arithmetic processing unit 1 verifies that comparator 15 correctly judges the match of the objects of comparison by sending data identical to the input diagnosis reference signal as test pattern 21 and verifying the fact that the matching result in comparator 15 works out to a match in a result output 24 from comparator 15, and further, by choosing test pattern 21 to be data different from input diagnosis reference signal 18, it intentionally makes comparator 15 detect a mismatch and verifies in the same way with output signal 24, being a result output, that comparator 15 surely detects the mismatch of the objects of comparison. At the same time that input diagnosis circuit 14 outputs result output 24 of comparator 15 to parallel input/output bus 6, it reports the completion of the self diagnosis to operation setting register 8, and operation setting register 8 transmits operation completion flag 26 via parallel input/output bus 6 to central arithmetic processing unit 1.

Central arithmetic processing unit 1 verifies comparator result output 24 from input device 2 and recognizes that an anomaly is occurring in input diagnosis circuit 14 if the result is a mismatch in case it is expected that result output 24 returns with a match or if the result is a match in case a mismatch is expected.

Figure 12:
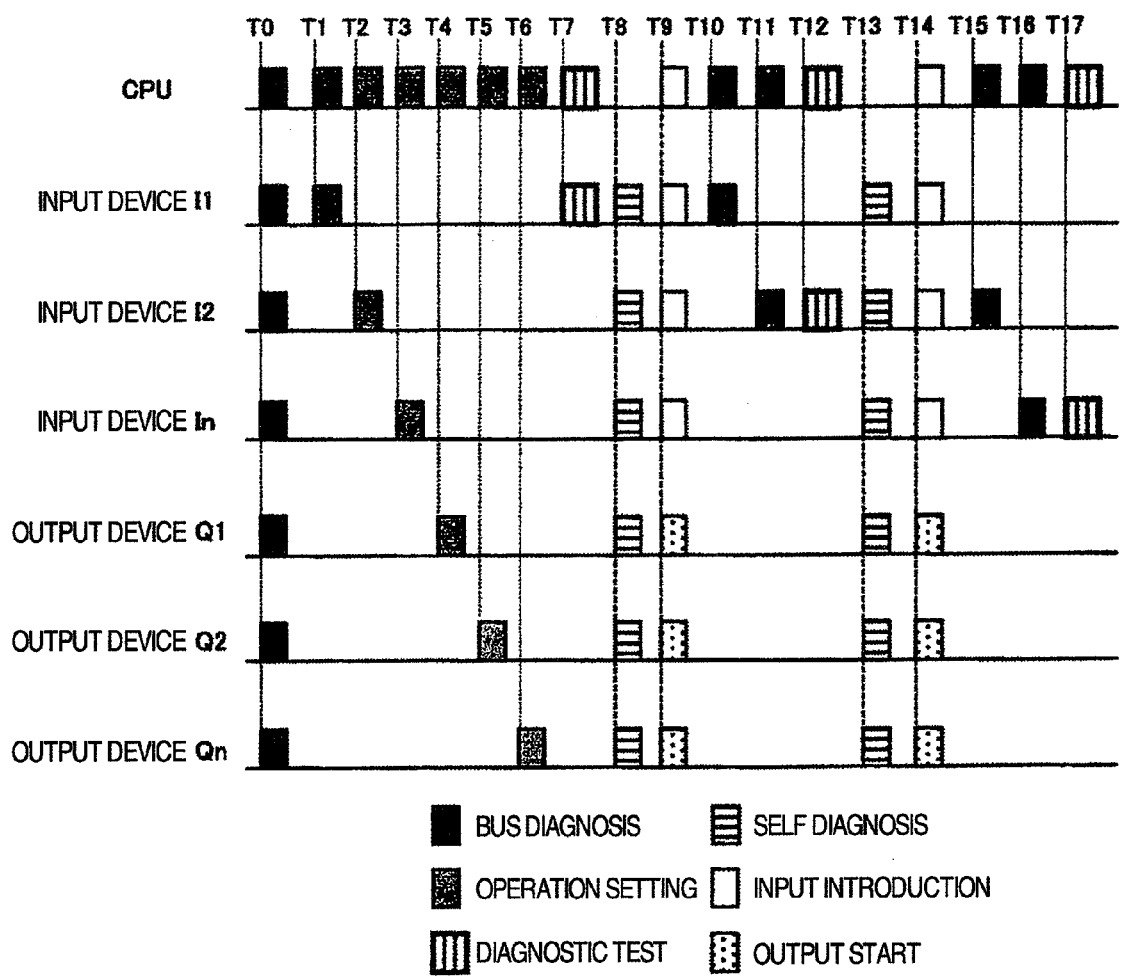
FIG. 12 is a time chart showing the operation of the first embodiment of the present invention.

The system is configured so that, in case activation is permitted for a plurality of operating modes, each mode is executed according to a sequence predefined in central arithmetic processing unit 1. In FIG. 12, there is shown a time chart of the execution order of each operating mode. As shown in the diagram, the order of the diagnostic test, the self diagnosis, and the input introduction (the output start in the case of the output device) is chosen.

Figure 8:
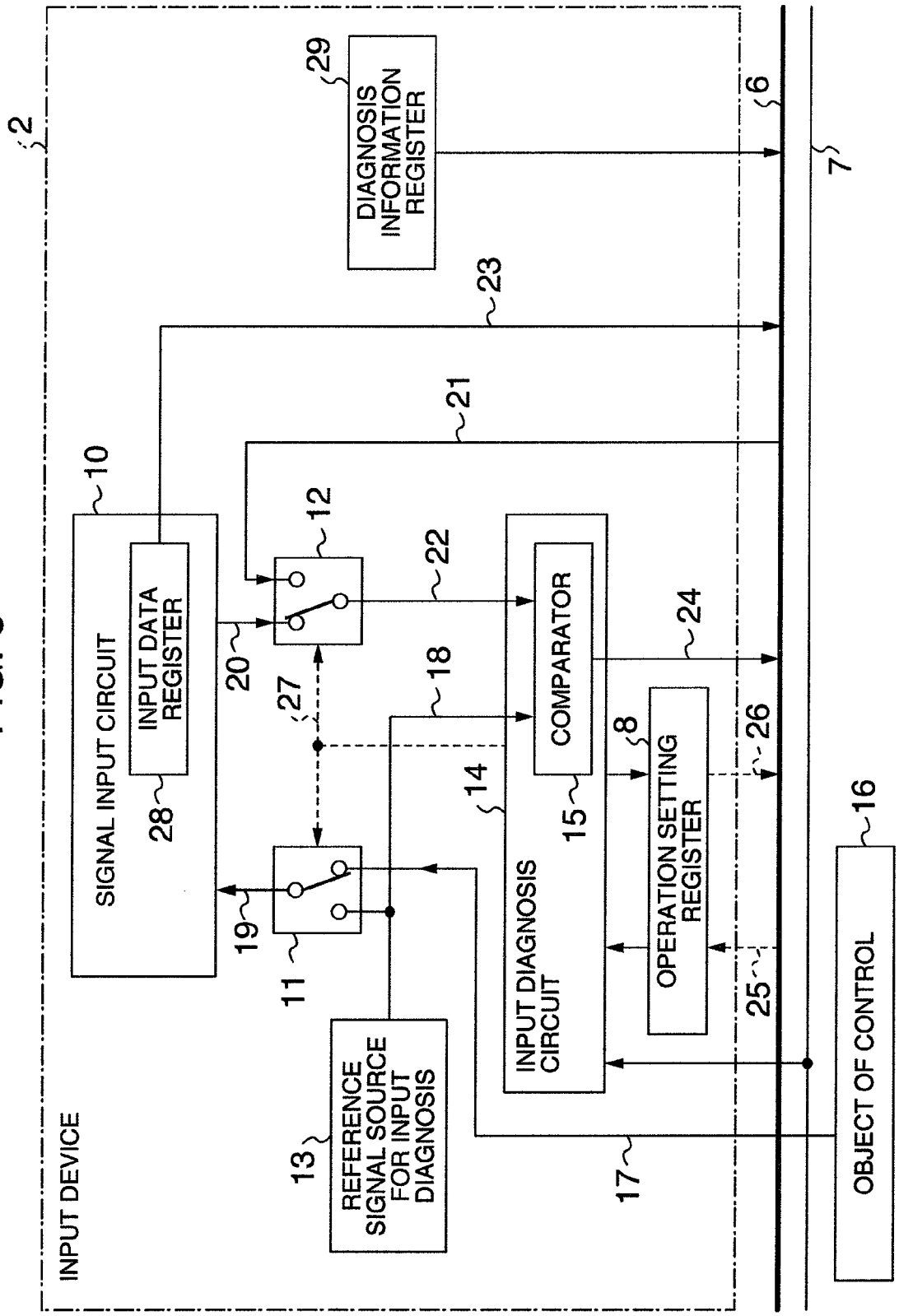
FIG. 8 is a block diagram explaining the configuration of an input device different from the input device of the present invention in FIG. 2.

Also, as shown in FIG. 8, it is possible to provide a diagnosis information register 29 and hold diagnosis contents and diagnosis times inside the register and make central arithmetic processing unit 1 read this information and decide on a self diagnosis and diagnostic test schedule.

Figure 5:
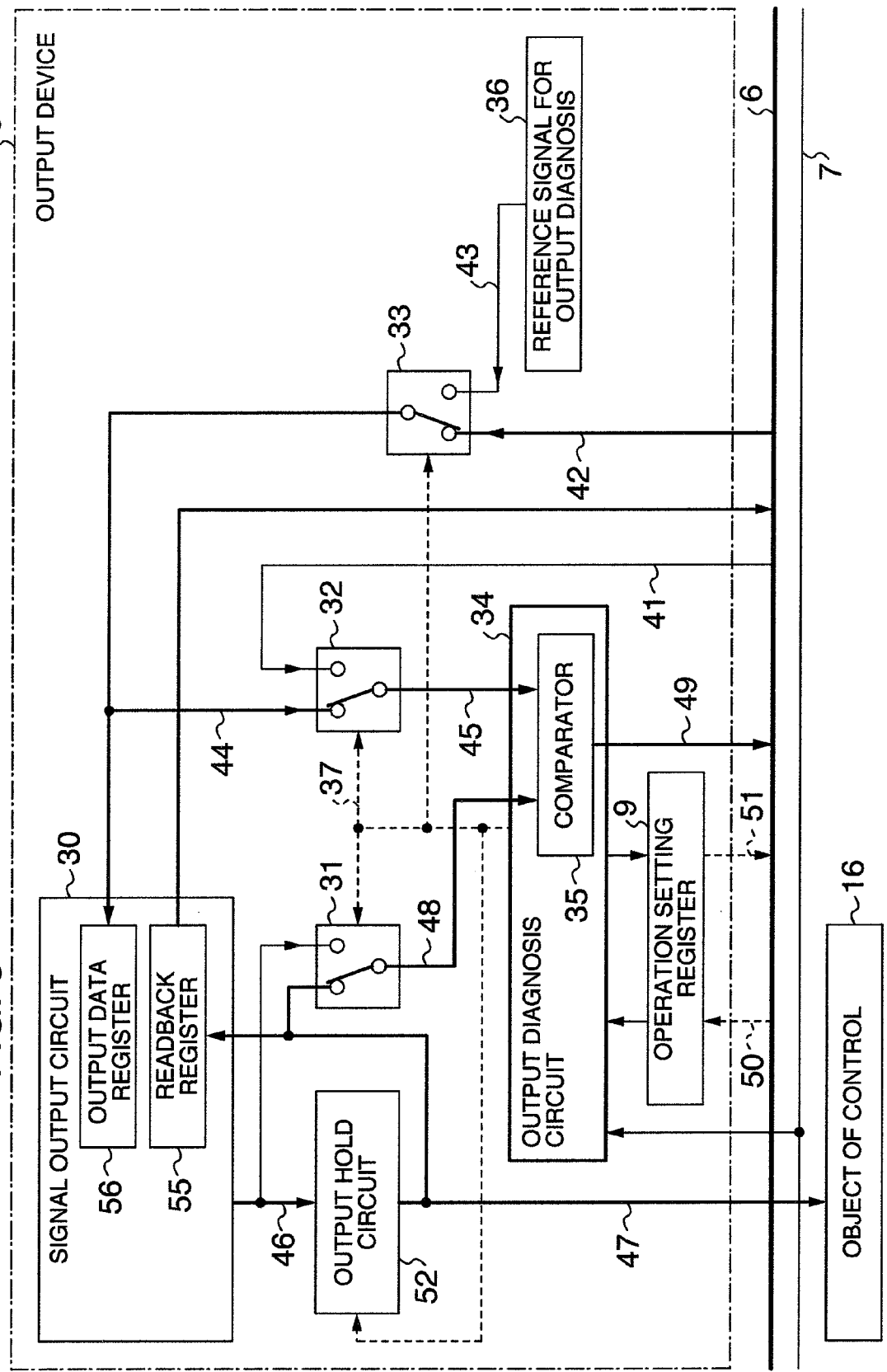
FIG. 5 is a block diagram explaining the configuration and normal output operation of an output device of the present invention.

Next, an explanation will be given regarding the configuration of output device 3, using FIG. 5. Output device 3 has a signal output circuit 30 outputting to the actual object of control 16 output data 42 from central arithmetic processing unit 1 to object of control 16; an output diagnosis reference signal source 36, and an output diagnosis reference signal 42 being the output thereof, for outputting, in a self diagnosis operation verifying the soundness of signal output circuit 30, a reference signal for diagnosis instead of output data 42 to object of control 16; a switch 33 for selecting either of output data 47 to object of control 16 or an output diagnosis reference signal 43 and inputting the same to signal output circuit 30; an output diagnosis circuit 34 for verifying the soundness of signal output circuit 30; an output hold circuit 52 for holding the output to object of control 16; a comparator 35 for comparatively checking the output diagnosis reference signal 43 test pattern, output data 46 and 47 to object of control 16, and output instruction data 44; a switch 31 for selecting either of actual output data 47 (output of output hold circuit) to object of control 16 and output data 46 of the signal output circuit and input the same to comparator 35 of output diagnosis circuit 34; a switch 32, separate from the aforementioned one, selecting either of output data 47 to object of control 16 and malfunction injection data 41 from central arithmetic processing unit 1 and inputting the same to comparator 35; and is provided with an output data register 56 for holding output data to the object of control inside signal output circuit 30 and a readback register 55 for holding output data 47 going to object of control 16.

Using FIG. 5, an explanation will be given regarding the output operation in which output device 3 carries out output from central arithmetic processing unit 1 to object of control 16. Output data 42 are sent, with respect to output device 3, from central arithmetic processing unit 1 to signal output circuit 30 via parallel input/output bus 6 and through switch 33 and are held in output data register 56 inside signal output circuit 30. Output device 3 has the activation permission for the output start set from central arithmetic processing unit 1 via parallel input/output bus 6 and a signal line 50 (control signal input) in operation setting register 9 and, by receiving activation signal 7, outputs the value set in the output data register of the signal output circuit to object of control 16 via output data 46 line and output hold circuit 52 (output data 47).

As shown in the diagram, output diagnosis circuit 34 switches, by means of a switch control signal 37, switches 31, 32, and 33 to connect one input of comparator 35 to output data 47 going to object of control 16 and to connect the other input to output data 42 from central arithmetic processing unit 1 and, simultaneously with carrying out a readback check of whether a value in conformity with the instruction from central arithmetic processing unit 1 is output to object of control 16, stores the read back output data 47 to a readback register 55 inside the signal output circuit. Output diagnosis circuit 34 outputs the value instructed from central arithmetic processing unit 1 to object of control 16 and, exactly when the readback check of output data 47 has reached completion, reports output completion to operation setting register 9, operation setting register 9 outputting an operation completion flag 51 to parallel input/output bus 6 and informing central arithmetic processing unit 1 of the fact that processing has reached completion.

Figure 7:
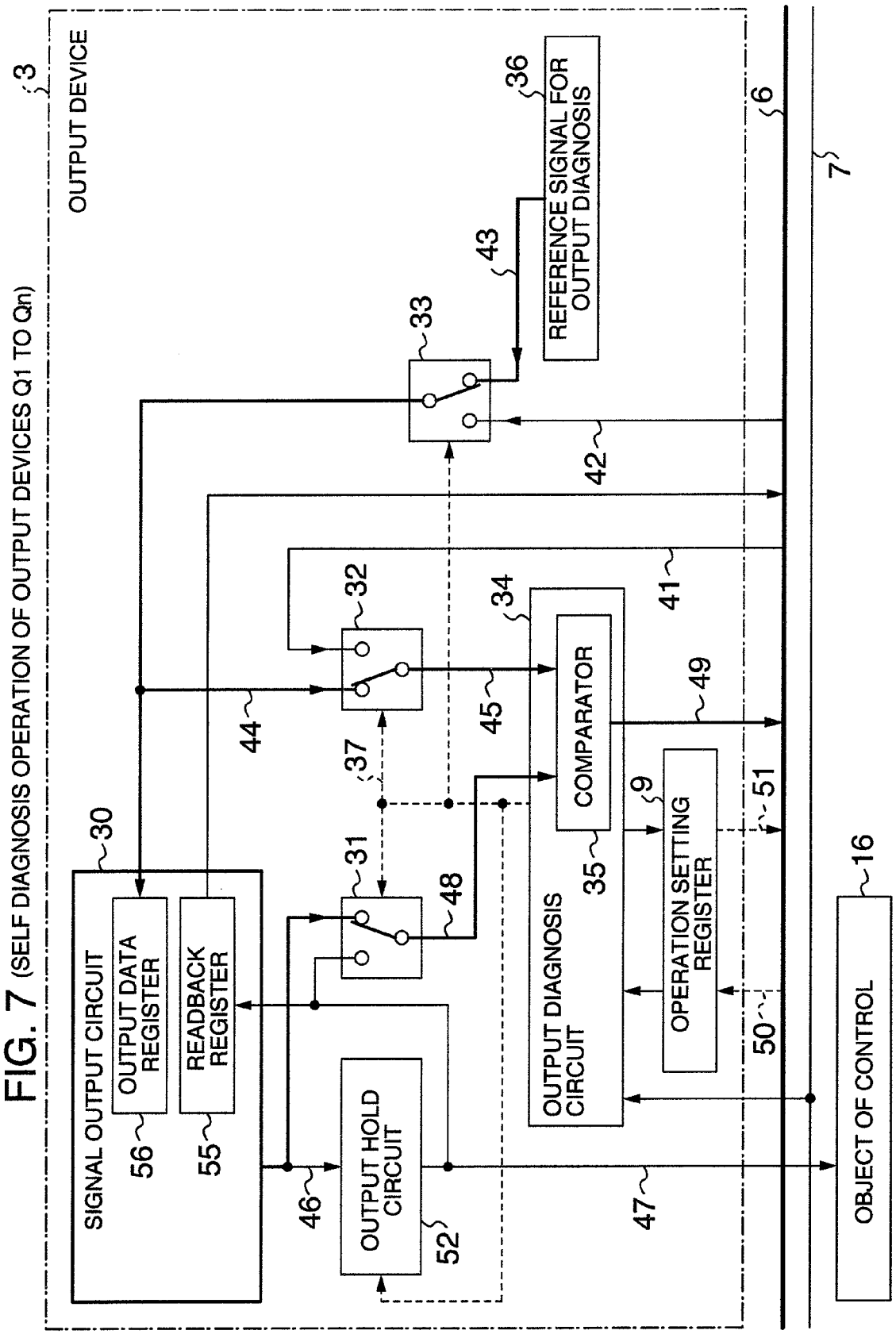
FIG. 7 is a block diagram explaining the configuration and self diagnosis operation of an output device of the present invention.

Next, an explanation will be given regarding the self diagnostic function of output device 3, using FIG. 7. Output device 3 has the activation permission for the self diagnosis set from central arithmetic processing unit 1 via parallel input/output bus 6 and signal line 50 in operation setting register 9 and starts the self diagnosis by receiving activation signal 7.

Output diagnosis circuit 34 controls switch 33 and switch 32 to input the input 44 to signal output circuit 30 and output diagnosis reference signal 43 to one input 45 of comparator 35 inside output diagnosis circuit 34 and simultaneously controls switch 31 to input output data 46 of signal output circuit 30 to the other input 48 of comparator 35. Output data 46 are the output diagnosis reference signal 43 held in output data register 56 of signal output circuit 30 and if signal output circuit 30 operates regularly, output data 46 and the output diagnosis reference signal match. Comparator 35 compares the matching of output diagnosis reference signal 43 and output data 46 and if both match, judges that signal output circuit 30 is regular, and if there is a mismatch, takes it that an anomaly has occurred in signal output circuit 30, and transmits a matching result output 49 through parallel input/output bus 6 to central arithmetic processing unit 1. Exactly when the comparative matching in comparator 35 has reached completion, output diagnosis circuit 34 reports the completion of the self diagnosis and operation setting register 9 outputs operation completion flag 51 to parallel input/output bus 6 and informs central arithmetic processing unit 1 of the fact that the self diagnosis has reached completion.

As far as the self diagnosis operation of output device 3 is concerned, in order that output diagnosis reference signal 43 not be output to object of control 16 for the duration of the self diagnosis, output hold circuit 52 is configured so that the output instructed from central arithmetic processing unit 1 is held during the self diagnosis.

Figure 6:
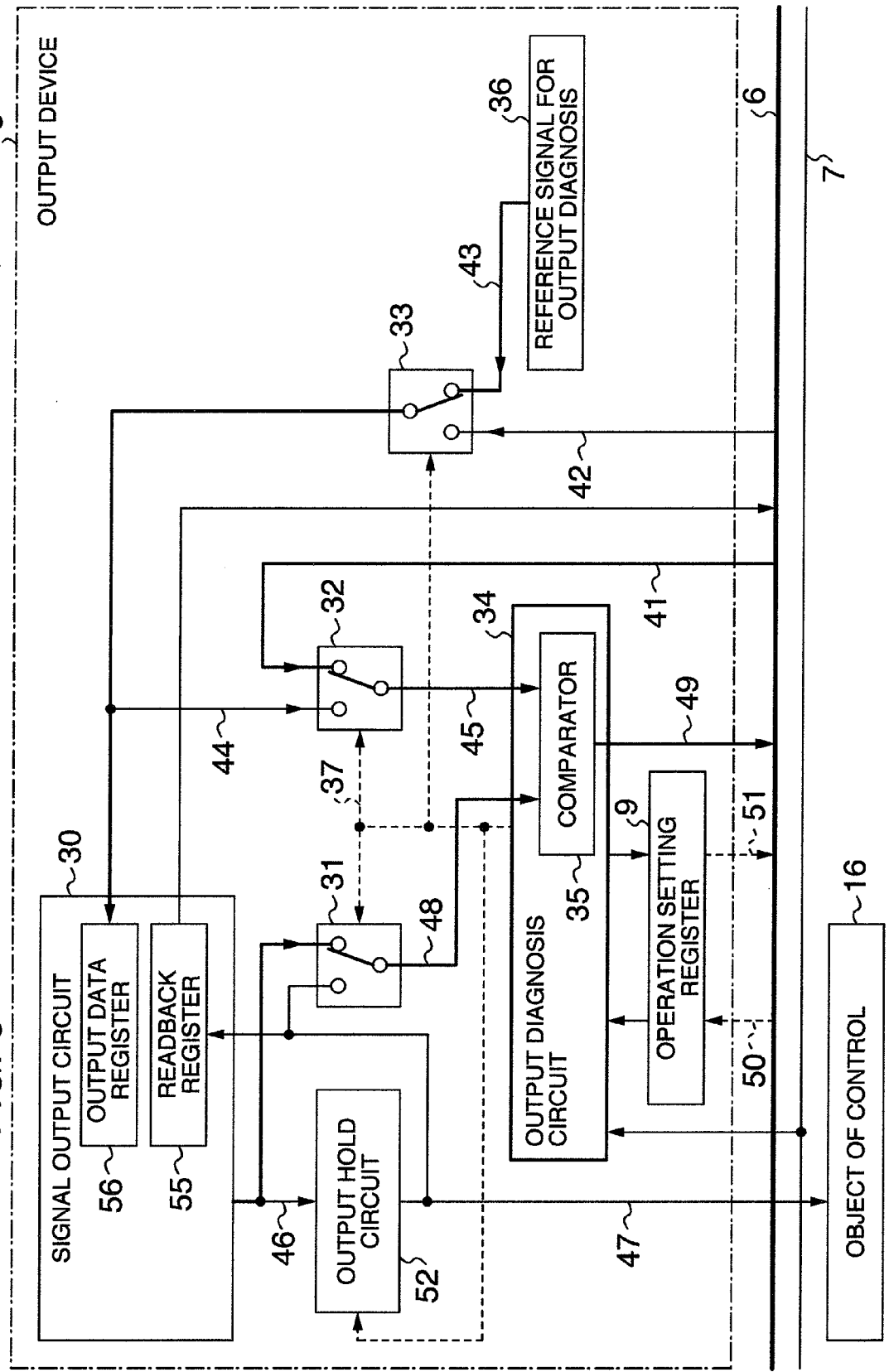
FIG. 6 is a block diagram explaining the configuration and diagnostic test operation of an output device of the present invention.

Next, an explanation will be given regarding the operation of the diagnostic test of output device 3, using FIG. 6. Output device 3 has the activation permission for the diagnostic test set from central arithmetic processing unit 1 via parallel input/output bus 6 and signal line 50 in operation setting register 9 and starts the diagnostic test by receiving activation signal 7 indicating the activation of the operation. As far as the diagnostic test as well is concerned, output diagnosis circuit 34 controls the switching of the connections of switches 31, 32, and 33 by means of switch control signal 37, but the point differing from the operation of the self diagnosis lies in the point that, as far as switch 32 is concerned, the circuit connects input 45 going to comparator 35 not to output diagnosis reference signal 43 but to a test pattern 41 from central arithmetic processing unit 1. To the other input of comparator 35, there are input the output data 46 for which output diagnosis reference signal 43 is output via signal output circuit 30. Output data 46, as explained in FIG. 7, are data that are identical to the output diagnosis reference signal.

Central arithmetic processing unit 1 sends data that are identical to output diagnosis reference signal 43 as test pattern 41 to verify that it is determined that the two inputs of comparator 35 are a match, and also sends data that are different from output diagnosis reference signal 43 as test pattern 42 and by verifying that it is determined that the two inputs to comparator 35 are a mismatch, verifies that the output diagnosis circuit is operating regularly.

Output diagnosis circuit 34, when the comparative matching in comparator 35 has reached completion reports the completion of the diagnostic test to operation setting register 9, and operation setting register 9 outputs operation completion flag 51 to parallel input/output bus 6 and informs central arithmetic processing unit 1 of the fact that the diagnostic test has reached completion.

Even as far as the diagnostic test of output device 3 is concerned, output hold circuit 52 is configured so that, for the duration of the diagnostic test, the output instructed from central arithmetic processing unit 1 is held during the diagnostic test in order that output diagnosis reference signal 43 is not output to object of control 16.

Figure 9:
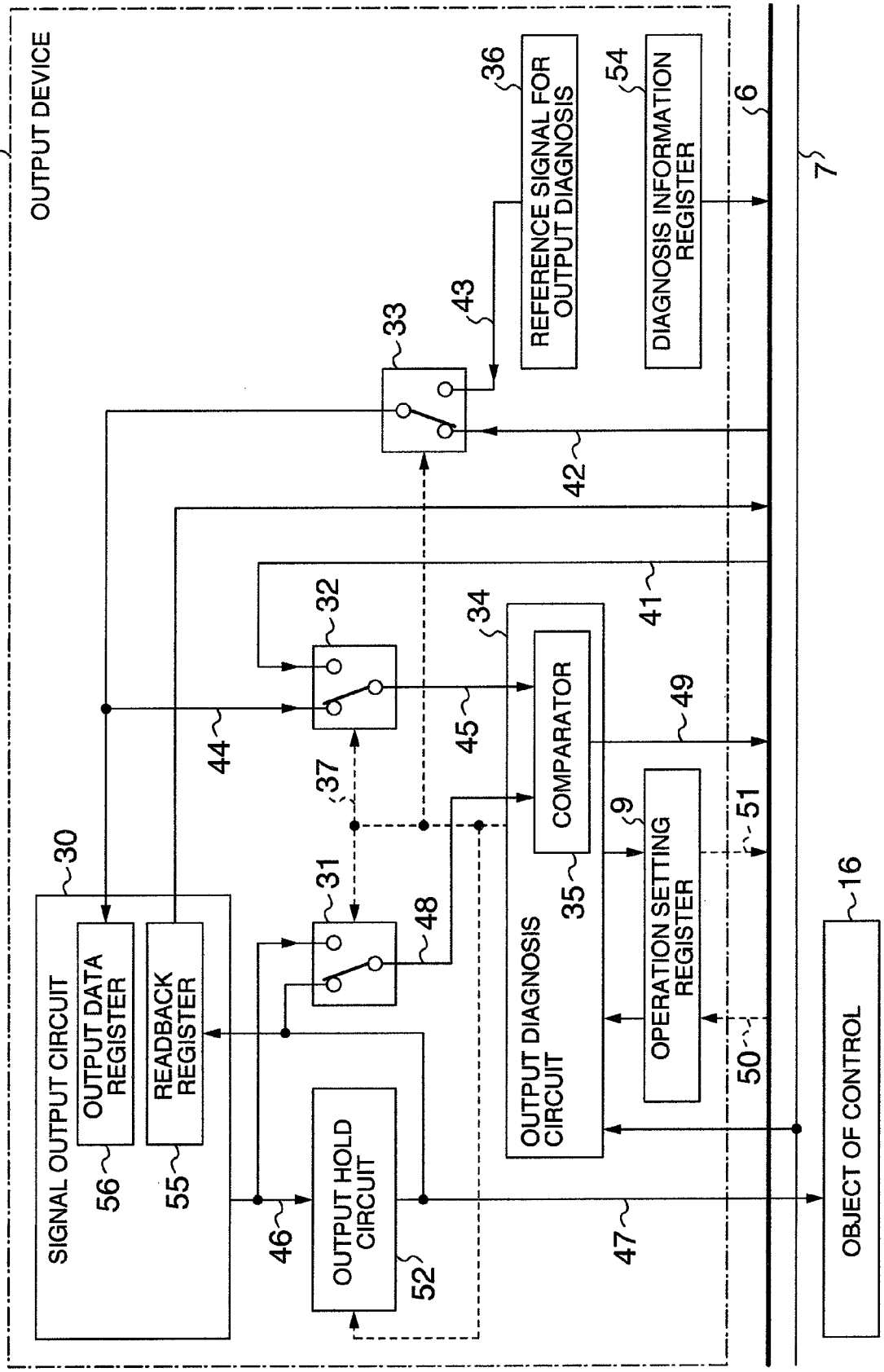
FIG. 9 is a block diagram explaining the configuration of an output device different from the output device of the present invention in FIG. 3.

As shown in FIG. 9, by providing a malfunction injection data register 53 inside output device 3 and presetting the register from central arithmetic processing unit 1, it also becomes possible to carry out a diagnostic test without outputting, to communication channel 6, the malfunction injection data from central arithmetic processing unit 1 for each execution of the diagnostic test. Further, a diagnostic information register 54 is provided and the diagnosis contents, the diagnostic time, and the like are held, and this information is read by central arithmetic processing unit 1, so it is possible to determine a schedule for the self diagnosis and the diagnostic test.

In FIG. 12, a time chart of the input and output operations of signals for the diagnostic test, the self diagnosis and going to object of control 16, of the central arithmetic processing unit (CPU), input device 2, and output device 3 in the present embodiment is shown. First, at time T0, central arithmetic processing unit 1 (CPU) carries out a bus diagnosis with respect to all input devices I1 to In and output devices Q1 to Qn connected to parallel input/output bus 6 and, at times T1 to T6, it carries out each operation setting in the register of each input device and output device. After the completion of the operation settings, central arithmetic processing unit 1 activates a diagnostic test with respect to input device I1 at time T7. As mentioned above, central arithmetic processing unit 1 carries out a diagnostic test of one input device or output device at a time, cyclically performing diagnostic tests of all input devices and output devices. At time T8, it conducts self diagnoses of the input devices and the output devices and at time T9, it carries out the introduction of an input from the object of control as well as an output start or an output update. At times T10 and T11, it performs a designation of the object of the diagnostic test, a change in the output instruction value to the output device, and the like, and at times T12 and later, it repeats the operation from T7 to T11.

Second Embodiment

Figure 13:
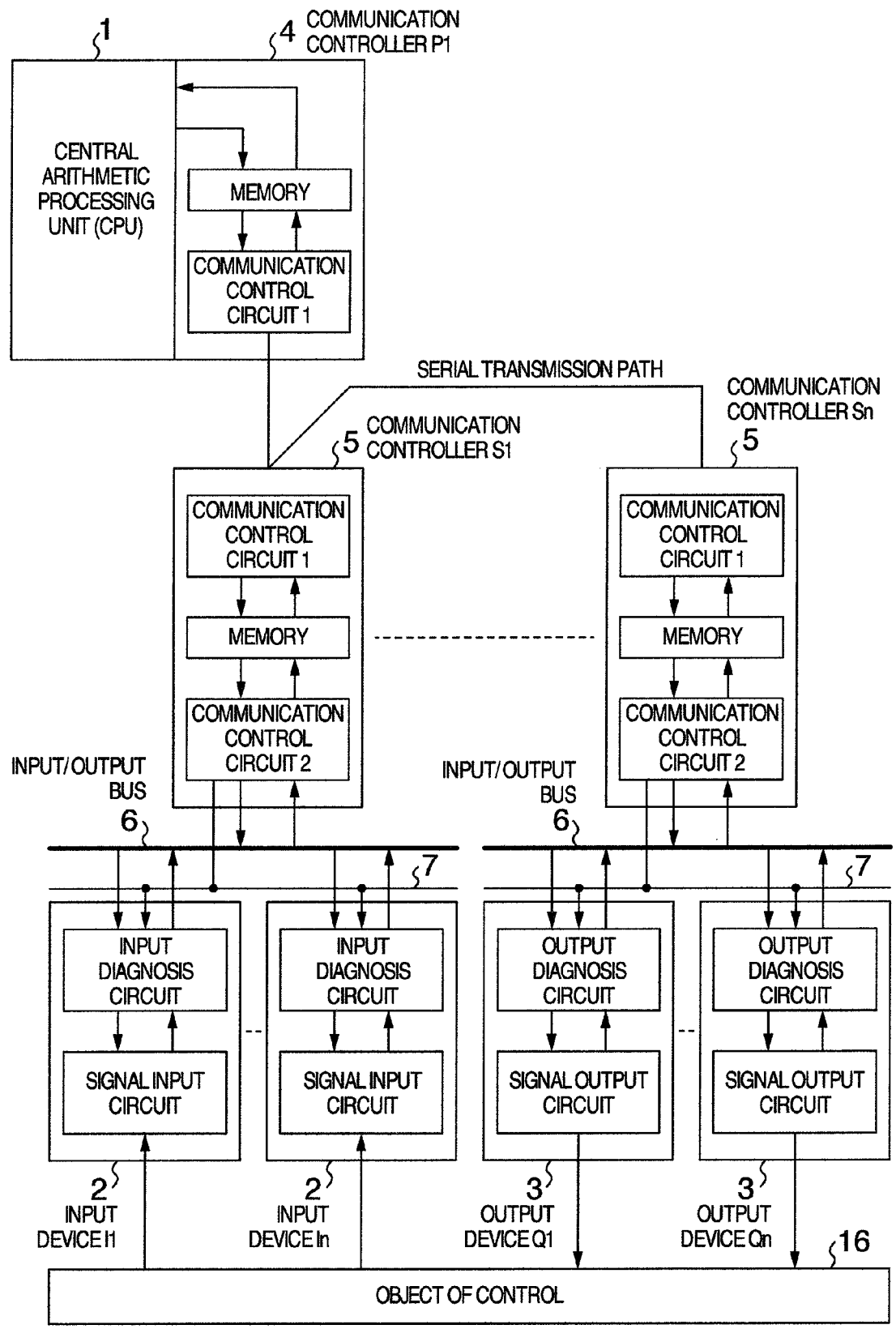
FIG. 13 is a block diagram showing a second embodiment of the present invention.

The effects of the present invention will be explained with respect to Embodiment 2 using FIG. 13 and FIG. 14. As shown in FIG. 13, the point of difference with Embodiment 1 resides in the fact that central arithmetic processing unit 1, input device 2, and output device 3 are connected via communication controller 4 and communication controller 5, that the communication between communication controller 4 and communication controller 5 is carried out by memory transfer via a serial line, and that the communication between communication controller 5 and input device 2 and output device 3 is carried out by memory transfer via parallel input/output bus 6. The transmission data from central arithmetic processing unit 1 to input device 2 and output device 3 are temporarily saved in a memory inside communication controller 4 and the transmission data of a plurality of input devices and output devices are collected into one frame, transferred via a serial transmission path to a memory inside communication controller 5, and distributed to the recipient input device 2 or output device 3 by means of communication controller 5. In the same way, regarding the transmission of data from input device 2 and output device 3 to central arithmetic processing unit 1, the data of a plurality of input devices and output devices, after having been saved in a memory inside communication controller 5, are collected into one frame, transferred to a memory inside communication controller 4 via a serial communication channel, and transmitted to central arithmetic processing unit 1. Because of this, unlike the case of Embodiment 1 in which central arithmetic processing unit 1, input device 2, and output device 3 are directly connected with parallel input/output bus 6 and transmission and reception of data are carried out directly from the central arithmetic processing unit to input device 2 and output device 3, central arithmetic processing unit 1 has a need to read back the destination address data in order to judge whether transmission data to input device 2 and output device 3 surely arrived. Accordingly, as shown in FIG. 14, as for the self diagnosis and diagnostic test activation procedures from central arithmetic processing unit 1 to input device 2 and output device 3, there is performed, after carrying out the setting of the permission and halt of the self diagnosis and diagnostic test activations to operation setting registers 8 and 9 (diagnostic setting registers), a readback of operation setting registers 8 and 9 (diagnostic setting registers) of the destination devices and, after checking whether the set value is written or not, instruction is given to activate the soundness check of the self diagnosis and the self-diagnostic function. After central arithmetic processing unit 1 has verified the match of the readback data, of operation setting registers 8 and 9 (diagnostic setting registers) of the destination devices, and the transmitted data, the activations of the self diagnosis and the diagnostic test are relayed to all input devices 2 and output devices 3 as a broadcast signal to communication controller 4, the system being devised so that the devices are activated simultaneously. When the diagnostic operations for which activations have been instructed come to an end, input device 2 and output device 3 raise diagnosis completion flags in the diagnostic setting registers and store the diagnostic results in diagnostic result registers. The data of the diagnostic setting registers and the diagnostic results are transferred to a memory inside communication controller 5 and are transferred to a memory inside communication controller 4 via a serial line. Central arithmetic processing unit 1 reads the values of the diagnostic setting registers and diagnostic result registers of input device 2 and output device 3 that are transferred into a memory inside communication controller 4, checks the diagnosis completion flags of the diagnostic setting registers, checks the diagnostic result data of the diagnostic result registers only in case the diagnosis has come to an end and, in case an error is generated, carries out the predefined error processing.

In FIG. 14, a time chart of the operations of central arithmetic processing unit 1, communication controllers P0, S1, and S2, and the input and output devices in the present embodiment is shown. At time T0, the central arithmetic processing unit (CPU) activates a bus diagnosis operation. Communication controller P0 relays the activation of the bus diagnosis with respect to communication controllers S1 and S2 and communication controllers S1 and S2 respectively conduct bus diagnoses with respect to input devices I1 to In and output devices Q1 to Qn, which are connected to parallel input/output bus 6. At times T2 to T9, central arithmetic processing unit 1 carries out the setting of operations with respect to each input device and output device via communication controllers P0, S1, and S2, performs a readback of set values from the input devices and the output devices, and verifies that the setting has been executed without fail. At time T10, central arithmetic processing unit 1 gives instruction to activate a diagnostic test, the instruction being relayed to input devices I1 to In and output devices Q1 to Qn via communication controllers P0, S1, and S2, and the device for which the activation of the diagnostic test has been permitted conducts the diagnostic test. At time T16, the central arithmetic processing unit (CPU) receives the result of the diagnostic test and, if there is no anomaly, instructs the input devices and output devices at time T17 to introduce input from the object of control and to start output or make an update.

The invention claimed is:

1. A controller comprising a communication control system including input devices controlling an object of control from a central arithmetic processing unit via a parallel communication channel and output devices making outputs to said object of control via said parallel communication channel;
wherein said input devices and output devices have a diagnostic test function, which is an operation in which the devices detect their own regularity or anomaly;
wherein said central arithmetic processing unit brings to operation the diagnostic function of said input devices and output devices with respect to a plurality of input devices or output devices, commands the activation of said diagnostic test function, and is configured so as to verify said diagnostic test result;
wherein said input devices and output devices have a function of checking the soundness of said diagnostic test function;
said controller transmitting and receiving data from said central arithmetic processing unit via a first communication channel which has at least in part serial transmission;
said communication control system being connected with said input devices and output devices via a second communication channel which has at least in part parallel transmission in order to aggregate or distribute said data;
wherein said central arithmetic processing unit has a collation part reading and collating permission and halt of the diagnostic function and the diagnostic function soundness check, set in said input devices and output devices, and an activation part activating a diagnosis and a diagnosis soundness check in said input devices and output devices, in response to the collating result.

2. A communication control system comprising input devices controlling an object of control from a central arithmetic processing unit via a parallel communication channel and output devices making outputs to said object of control via said parallel communication channel;
wherein said input devices and output devices have a diagnostic test function, which is an operation in which the devices detect their own regularity or anomaly;
and wherein said central arithmetic processing unit brings to operation the diagnostic function of said input devices and output devices with respect to a plurality of input devices or output devices, commands the activation of said diagnostic test function, and is configured so as to verify said diagnostic test result;
wherein said input devices and output devices have a function of checking the soundness of said diagnostic test function; and
wherein a recipient communication device with said serial transmission performs diagnostic tests of the input devices and output devices connected to the same input/output parallel bus as that of said communication device.

* * * * *